United States Patent [19]
Müller

[11] Patent Number: 5,909,167
[45] Date of Patent: Jun. 1, 1999

[54] MULTI-PHASE TRANSFORMER

[75] Inventor: Walter Müller, Uffing, Germany

[73] Assignee: Siemens Aktiengesellschaft, Munich, Germany

[21] Appl. No.: 08/895,402

[22] Filed: Jul. 16, 1997

Related U.S. Application Data

[63] Continuation of application No. PCT/DE96/00023, Jan. 10, 1996.

[30] Foreign Application Priority Data

Jan. 16, 1995 [DE] Germany .................. 195 01 082

[51] Int. Cl.⁶ .................. H01F 27/28; H01F 27/02
[52] U.S. Cl. .................. 336/225; 336/229; 336/92; 336/227; 336/223
[58] Field of Search ................ 336/225, 229, 336/223, 227, 92, 94, 90

[56] References Cited

U.S. PATENT DOCUMENTS 4,151,498  4/1979  Katsurai .................. 335/216

FOREIGN PATENT DOCUMENTS

| 0422556A1 | 4/1991 | European Pat. Off. . |
| 937184 | 12/1955 | Germany . |
| 1204322 | 11/1965 | Germany . |
| 1488322 | 4/1969 | Germany . |
| 357169210 | 10/1982 | Japan . |
| 6-0024-491-A | 7/1983 | Japan .................. 336/229 |
| 6-2105-080-A | 11/1985 | Japan .................. 336/229 |
| 411124 | 10/1966 | Switzerland . |

*Primary Examiner*—Michael L. Gellner
*Assistant Examiner*—Anh Mai
*Attorney, Agent, or Firm*—Herbert L. Lerner; Laurence A. Greenberg

[57] ABSTRACT

A superconductive multi-phase transformer has a toroidal winding disposed in a tank with a cooling medium. The toroidal winding is divided along its course for each phase into winding sections. Magnetic fluxes in the winding sections are closed by at least one yoke. The tank is divided into tank sections at separating points of the toroidal winding by the at least one yoke.

8 Claims, 5 Drawing Sheets

MULTI-PHASE TRANSFORMER

CROSS-REFERENCE TO RELATED APPLICATION

This application is a continuation of International Application Serial No. PCT/DE96/00023, filed Jan. 10, 1996.

BACKGROUND OF THE INVENTION

Field of the Invention

The invention relates to a multi-phase transformer having a superconductive toroidal winding.

In the case of transformers for high powers, the use of superconductive materials for conductors of windings is known in order to achieve low weights and losses. Configurations without iron, that is to say without a transformer core, are preferably used in that case. In order to avoid a magnetic field which is emitted into the environment of the transformer, the winding itself forces the main field to be guided as far as possible in closed flux loops for reasons of electromagnetic compatibility (EMC).

One known solution to that problem is the toroidal winding, in which favorable guidance of the main field is possible. The toroidal winding in that case is produced from a tube-like material. Such a toroidal winding requires a complex manufacturing technique. In order to achieve the superconductivity, the toroidal winding is accommodated in a cryostat vessel, in particular a tank or any other suitable vessel, which contains a cooling medium. Such superconductive transformers have heretofore only existed in practice as trial models, in a single-phase structure.

A superconductive transformer which is disclosed in Swiss Patent 411 124 has windings disposed in a toroidal shape and cross sections of the windings have an annular shape. German Published, Non-Prosecuted Patent Application 1 488 322 discloses a transformer having superconductive windings, in which windings that are interleaved coaxially in one another are disposed on a common core which is closed in an annular shape. In addition, a direct current winding is provided which is divided into winding elements in such a manner that voltages which are induced in it because of alternating fluxes in the magnetic circuit cancel one another out.

German Published, Prosecuted Patent Application 1 204 322 discloses a three-phase transformer having windings disposed in a known manner on a five-limbed core. The core is constructed from three parts. Each core part is assigned one separate container in each case, and each container is provided with a flange. The transformer can be disassembled, with its core and container parts, for the purpose of transportation.

SUMMARY OF THE INVENTION

It is accordingly an object of the invention to provide a superconductive multi-phase transformer, which overcomes the hereinafore-mentioned disadvantages of the heretofore-known devices of this general type, which can be produced particularly easily and which can be handled in a favorable manner.

With the foregoing and other objects in view there is provided, in accordance with the invention, a multi-phase transformer, comprising a tank for a cooling medium; a superconductive toroidal winding disposed in the tank and divided along its course into winding sections for phases; at least one yoke closing magnetic fluxes in the winding sections; the tank being divided into tank sections at separating points in the toroidal winding through the use of a yoke; and the winding sections each being disposed in a respective associated one of the tank sections.

In this way, a transformer is provided which is assembled like building blocks, phase by phase. In consequence, it can be produced and transported in small physical units which have a low weight. Each tank section in this case can also be assigned a dedicated coolant circuit, as a result of which operational reliability is improved over the prior art.

In accordance with another feature of the invention, the yokes are disposed between the tank sections. This simplifies assembly of the transformer. In addition, the yokes can then be operated at a different temperature from that inside the tank, for example at room temperature.

In accordance with a further feature of the invention, the tank sections are connected to one another by flanges. These flanges are then preferably disposed in the region of the yokes, which results in simple, space-saving assembly.

In accordance with an added feature of the invention, a common yoke is provided for at least two winding sections, in particular for all of them. This makes it possible to save material and weight, with small physical dimensions.

In accordance with an additional feature of the invention, the toroidal winding is extended and is divided in its extended direction by transverse division into the winding sections, as a result of which at least one phase, if appropriate, has two winding sections which are connected to one another by two yokes. In consequence, the tank and its sections can be constructed in a very simple, in particular box-shaped, form. This also results in simple production, transportability and storability.

In accordance with yet another feature of the invention, in order to produce a particularly space-saving structure, the extended toroidal winding is additionally folded. In this way, the tank is very compact. This can also have a favorable effect for optimization of the tank volume which is required for the transformer. As a result of the folding, very small transformer sizes can be achieved with the same electrical values.

In accordance with yet a further feature of the invention, the transformer is of three-phase construction. It is thus particularly suitable for use in existing power distribution networks.

In accordance with a concomitant feature of the invention, the tank is disassembled into the tank sections for transportation.

Other features which are considered as characteristic for the invention are set forth in the appended claims.

Although the invention is illustrated and described herein as embodied in a multi-phase transformer, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
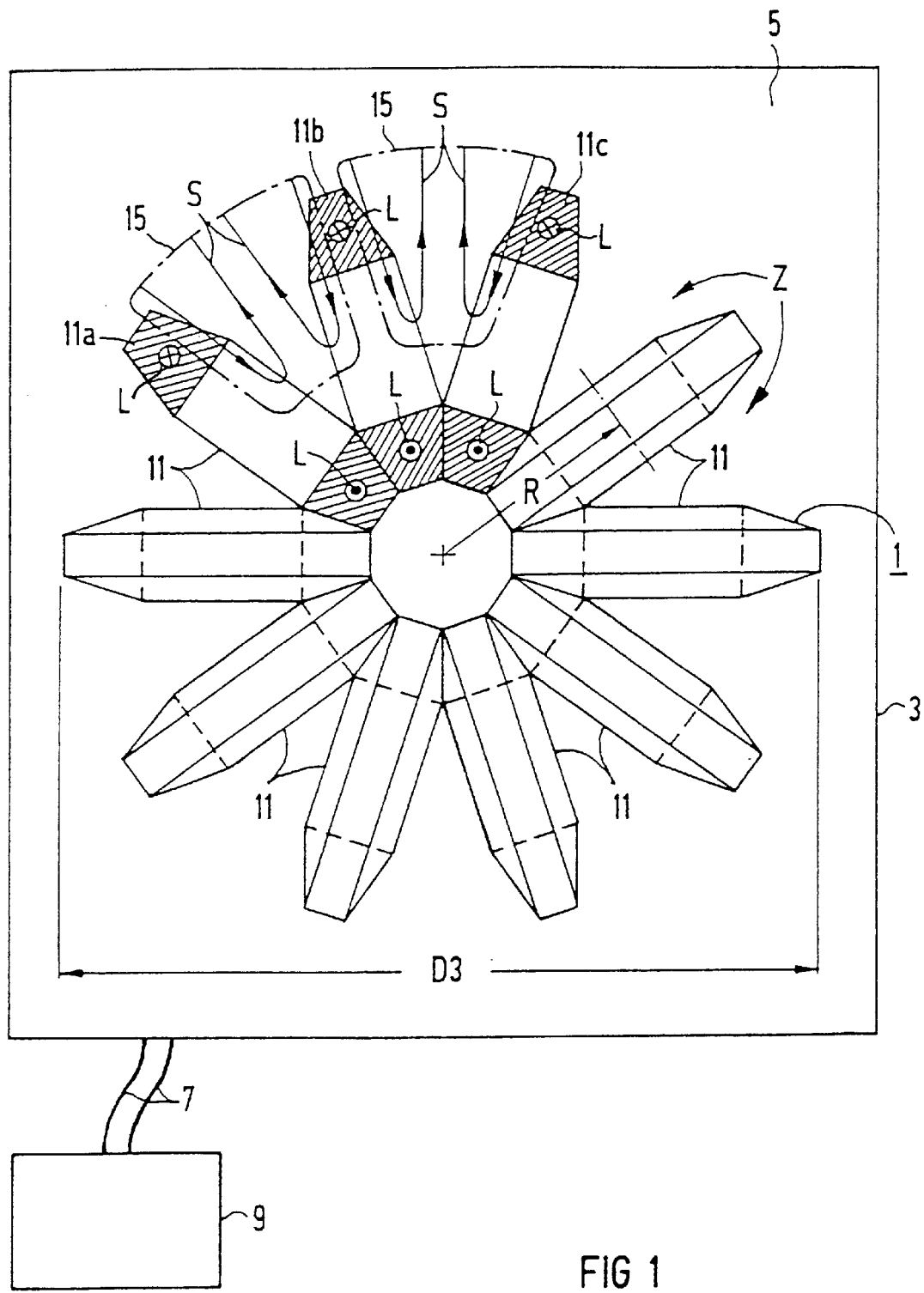
FIG. 1 is a diagrammatic, elevational view of a superconductive transformer having a toroidal winding.

Referring now to the figures of the drawings in detail and first, particularly, to FIG. 1 thereof, there is seen a superconductive transformer 1 which is disposed in a housing 3 that is used as a cryostatic vessel. The basic illustration shows that an interior 5 of the housing 3 is connected through supply lines 7 to a cooling device 9. The cooling device 9 cools a cooling medium contained in the housing 3 down to a required low temperature.

In principle, the transformer 1 has one winding, which is constructed in the manner of a toroidal winding, similarly to a closed hose ring. The toroidal winding in this case is formed by a multiplicity of first winding elements 11, 11a, 11b, 11c, which are joined to one another like sectors. In the process, they form a polygonal configuration.

Figure 2:
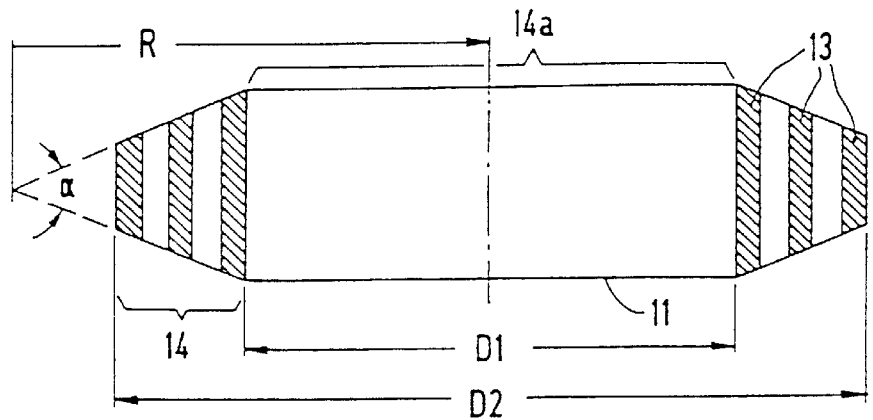
FIG. 2 is a sectional view of a first winding element for a toroidal winding according to FIG. 1.

FIG. 2 shows a section through such a first winding element 11, in detail. The first winding element 11 is initially constructed like a ring with an inner diameter D1 and an outer diameter D2. Depending on the desired transformer type, appropriate concentric tubular conductors 13 are disposed coaxially in the first winding element 11 and are used as conductors for the winding. In this case, by way of example, the winding element 11 is illustrated with three tubular conductors 13, which may be used for a three-winding transformer or else for a double-concentric configuration of a two-winding transformer.

Since it is intended to form a superconductive component in this case, the tubular conductors are, of course, manufactured from a superconductive material, for example a high or low temperature conductor (HTC or LTC).

The winding element 11 has a profile with a wedge-shaped or trapezoidal cross section, at least in a region 14 of those surfaces of adjacent winding elements which are in contact with one another. In contrast to an O-ring having a circular cross section, it is thus possible to refer to a trapezoidal ring in this case.

A corresponding trapezoid angle α depends on the geometry provided for the toroidal winding, in particular the radius and the number of winding elements 11. As is illustrated, the winding element 11 is preferably constructed to be rotationally symmetrical, so that it is not necessary to provide any particular position while the winding elements 11a, 11b, 11c are being joined together. However, asymmetric shapes or, in contrast to the annular shape, even polygonal or oval structures are also possible, although they are not illustrated in more detail.

It is possible to see in FIG. 1 how a predetermined number of winding elements 11 to 11c, namely ten, are joined together like a polygon to form a toroidal winding. In order to keep intermediate spaces Z between the winding elements 11 to 11c as small as possible, the number of first winding elements 11 to 11c can be chosen to be high. This avoids an escape of the magnetic flux radially between the first winding elements 11 to 11c. In principle and as an alternative, it is also possible to construct the first winding elements to have a cross section completely in the form of an annular ring sector, so that the intermediate spaces Z are virtually completely avoided.

In order to avoid the electromagnetic flux emerging radially from the toroidal winding, shielding bodies 15 (illustrated in phantom) may be disposed, as an example, on the first winding elements 11a, 11b, 11c. The shielding bodies 15 are constructed roughly in a saddle shape and each overlap an intermediate space Z between two winding elements 11a and 11b or 11b and 11c, respectively. Reference symbol S qualitatively illustrates courses of resultant eddy current paths in the shielding bodies 15 with respect to a no-load current flow L shown in the first winding elements 11a to 11c.

The shielding bodies 15 are likewise manufactured from a superconductive electromagnetic material. They can also be implemented by coating surfaces of an appropriately shaped base material with superconductive material.

Alternatively, the base material may also be formed from linear superconductors. This results in a skeleton-like base. If appropriate, the shielding bodies 15 themselves can be constructed to have such a skeletal structure. The individual conductors or wires of the skeleton are then electrically connected to one another.

The first winding elements 11a to 11c and the shields 15 can be attached to one another by non-illustrated attachment devices such as retaining elements made of plastic, or else they can be bonded to one another in a simple manner.

Figure 3:
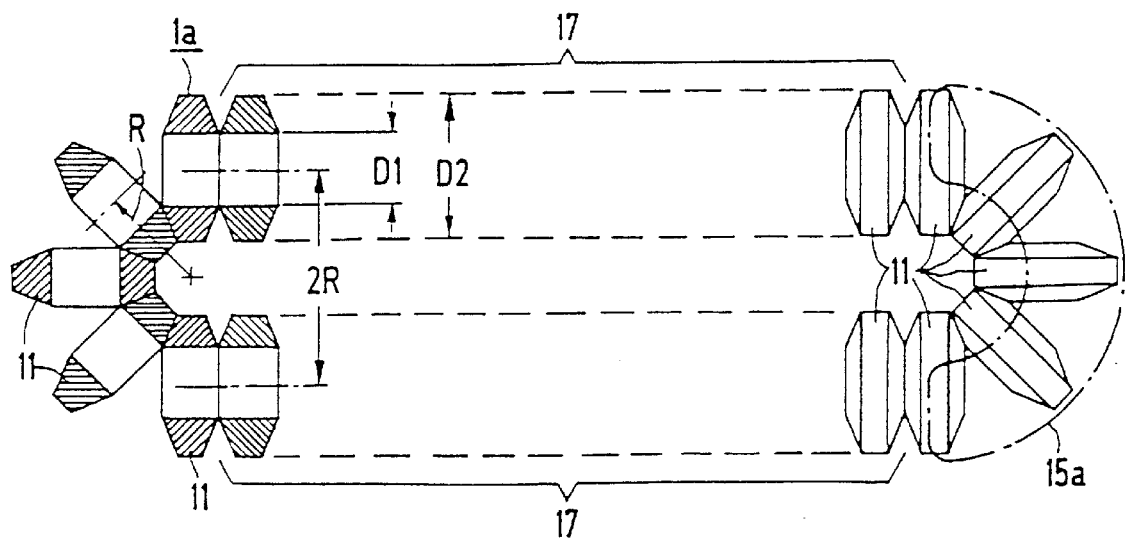
FIG. 3 is a sectional view of a toroidal winding having an extended structure.

In order to avoid a large polygon diameter D3 in the case of relatively high power levels, for example in the case of power transformers having a single-phase rating of more than 10 MVA, it may be advantageous to construct a transformer 1a according to FIG. 3 with an extended toroidal winding (illustrated without the housing). Specifically, in this case it may be possible to use a smaller radius R than that shown in FIG. 1, in which two half-polygons are connected to one another through the use of two straight sections 17. The straight sections 17 may, of course, be formed by simple non-illustrated concentrically disposed straight tubular pieces. However, the straight sections can also be formed by using the novel first winding elements 11. Specifically, they can be positioned in a straight line adjacent one another in the vicinity of their inner diameter D1 seen in FIG. 2, to form a straight flux tube. In this way, the entire winding configuration is formed from a standard first winding element 11. A screening body 15a can also cover a plurality of winding elements 11, so that a half-shell-like shield 15a is formed, as is shown in FIG. 3.

As a result of the fact that the first winding elements 11 can be disposed in a straight line and at angles to one another, any desired physical shapes can be produced for the winding of a transformer or of a coil. This is particularly advantageous if specific physical sizes or physical shapes have to be complied with.

Figure 4:
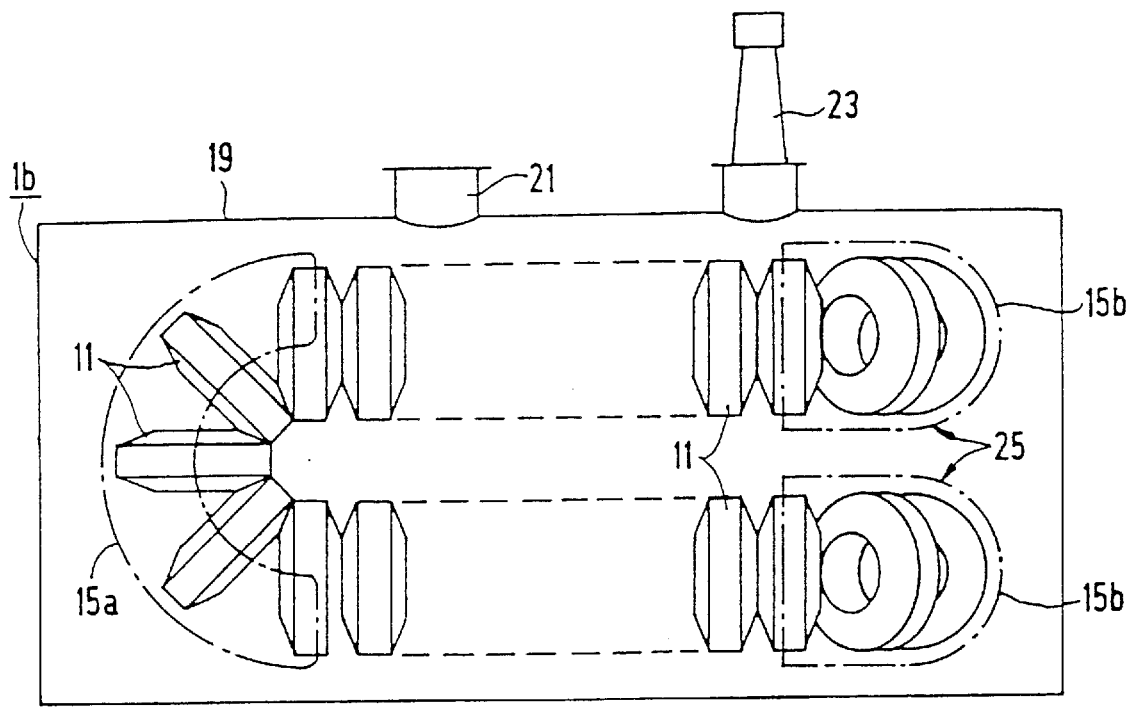
FIG. 4 is a side-elevational view of a transformer having an extended toroidal winding, with a folded construction.
Figure 5:
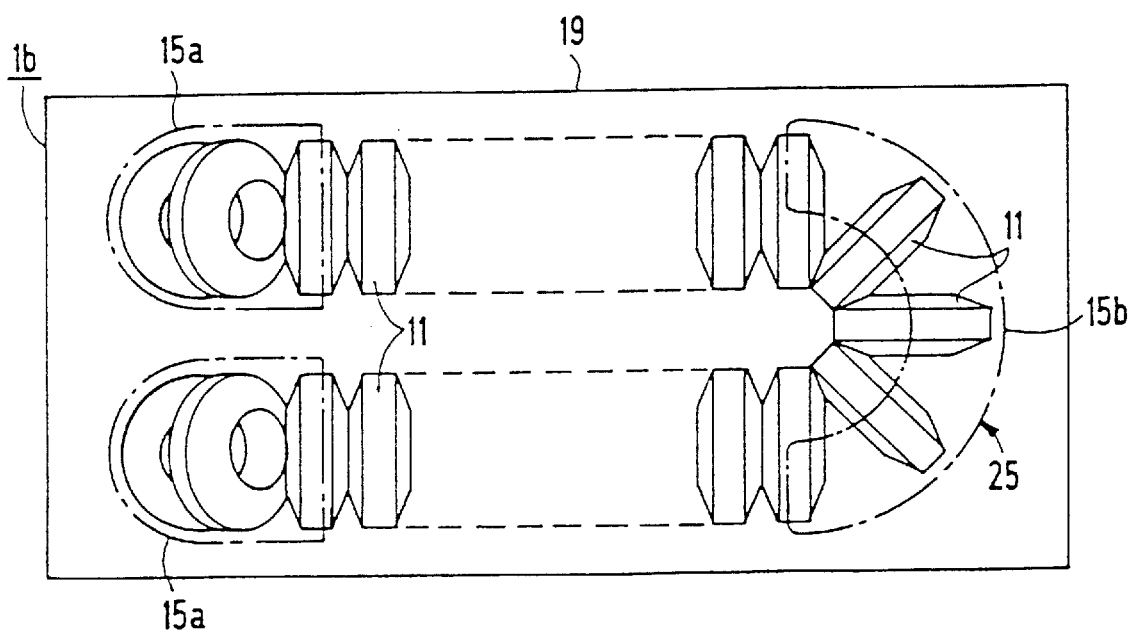
FIG. 5 is a plan view of the transformer according to FIG. 4.
Figure 6:
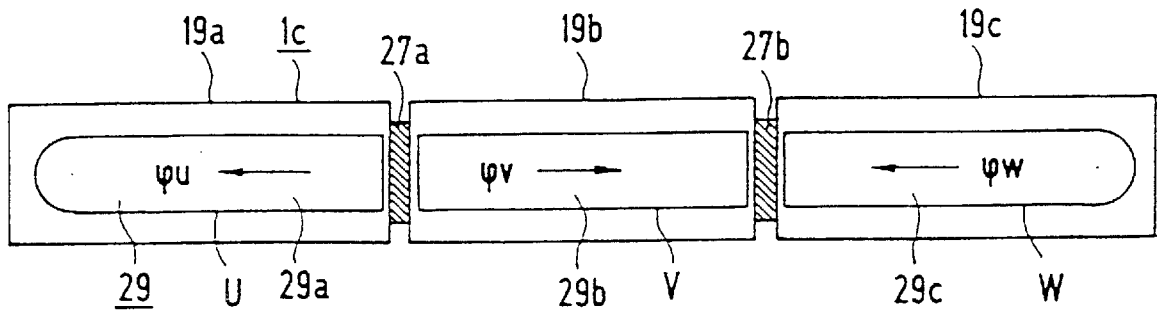
FIGS. 6 and 7 are respective basic plan and side-elevational views of a three-phase transformer having an extended toroidal winding.

FIGS. 4 and 5 show a further embodiment of a superconductive transformer 1b in which the extended winding configuration according to FIG. 3 is additionally folded. The two figures show a tank 19 of the transformer 1b which, by way of example, has a cooling system connection 21 and a high-voltage bushing 23. This construction has a physical length which is shorter than that in FIG. 3 and which can be achieved without any additional components. Specifically, the winding configuration having the novel winding elements 11 can be deformed like a chain formed by links. Shielding bodies 15b are likewise preferably provided at additional bend locations 25, for flux control.

Figure 7:
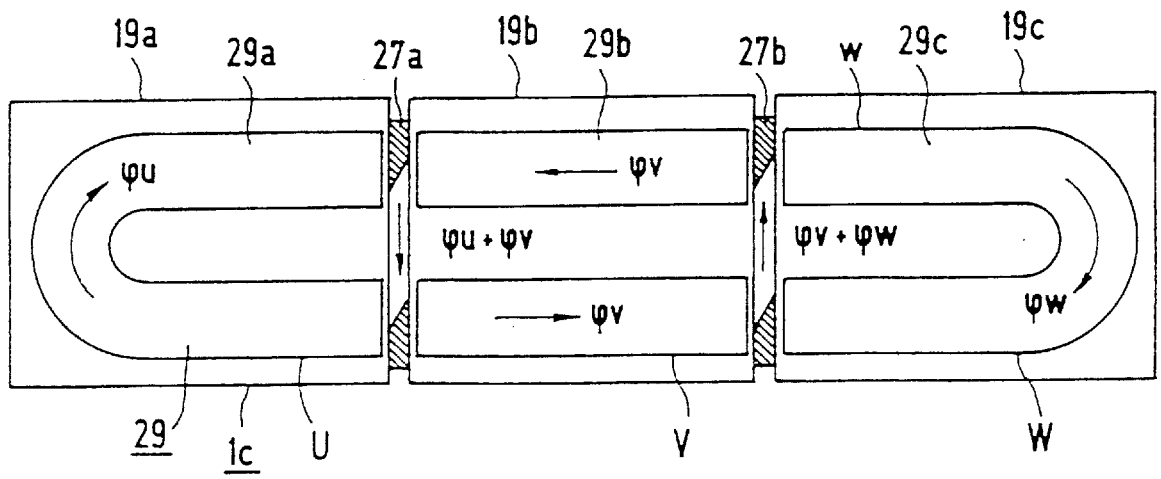
Figure 8:
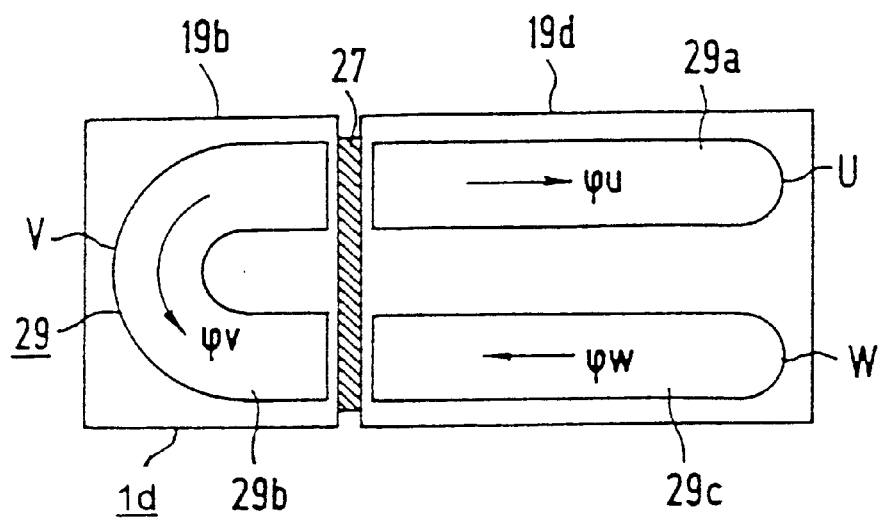
FIGS. 8 and 9 are respective basic plan and side-elevational views of a three-phase transformer having a folded toroidal winding.
Figure 9:
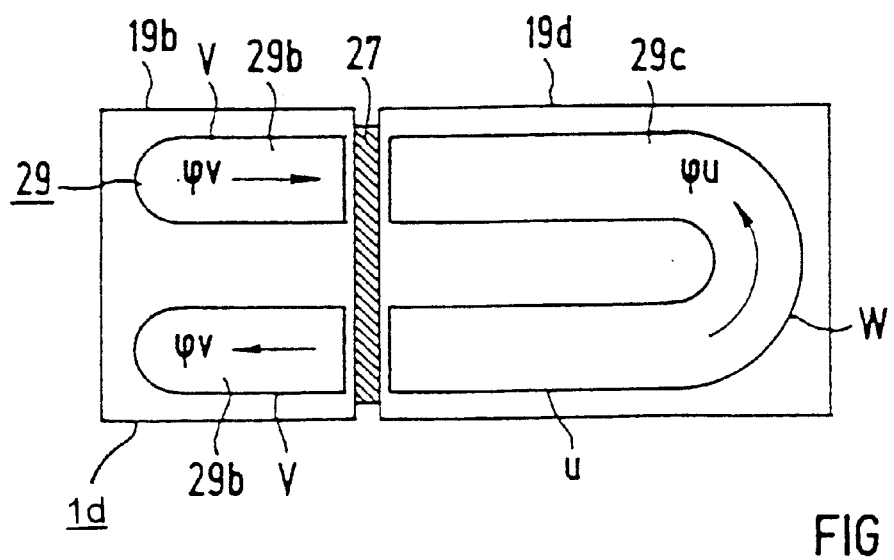

FIGS. 6, 7 and 8, 9 show respective multi-phase superconductive transformers 1c and 1d in a side view and a plan view. In this case a winding 29 is illustrated only in principle. It can be seen in this case that only one common toroidal winding 29 is provided for all of the phases U, V, W, which in the present case number three. This toroidal winding 29 is divided into individual winding sections 29a to 29c for the individual phases U, V, W. The winding sections 29a to 29c of the phases U, V, W are separated from one another by yokes 27a, 27b shown in FIGS. 6 and 7. The illustrated, extended toroidal winding 29 of the transformer 1c in this exemplary embodiment is divided transversely in its extended direction, so that only the two yokes 27a, 27b are necessary. The phase V is accordingly split into two winding sections 29b, which are separated from one another, as is seen in FIG. 7.

Magnetic fluxes $\phi u$, $\phi v$, $\phi w$ which are produced are shown in the figures. The flux direction of the central phase V is chosen to be opposite to the positive flux directions of the phases U and W so that the minimum possible fluxes $\phi u$, $\phi v$, $\phi w$ are produced, by vectorial addition, at the yokes 27a, 27b.

The division into the winding sections 29a, 29b, 29c is at the same time used to split the tank into three tank sections 19a, 19b, 19c. The tank sections 19a, 19b, 19c are provided with non-illustrated flanges (according to the prior art) in the vicinity of the yokes 27a, 27b, at surfaces thereof which are in contact with one another, so that good mechanical and magnetic coupling is possible between units which are respectively formed. In consequence, such a transformer 1c can be transported in a number of parts, which is advantageous particularly for large transformers since transportation size and weight repeatedly represent a problem in that regard. If appropriate, the yokes 27a, 27b and the flanges can advantageously be combined to form one physical unit. The yokes 27a, 27b are manufactured from conventional transformer laminates and are disposed externally between the tank sections 19a, 19b, 19c, so that they are operated at normal environmental temperatures, that is to say roughly between 0 and 100° C.

The tank sections 19a, 19b, 19c can be constructed to be box-shaped in the case of the present simple division of the toroidal winding 29, as a result of which they can be produced easily. A star-shaped division of the entire transformer is also conceivable, in which case a cylindrical tank is used that is split in a star shape depending on the number of phases.

This configuration, which by way of example has three phases, can also be produced in a folded construction in accordance with the above statements. In the folded structure according to FIG. 9, the winding sections 29a and 29c of the phases U and W come to rest alongside one another in this configuration. They can then also be advantageously accommodated in a common tank section 19d. The tank shape in this case may be cylindrical or else box-shaped, as required. In the case of this construction, only one common yoke 27 is required, as well.

The features of the individual structures can, of course, be combined with one another or replaced by one another without departing from the basic concept of the invention.

I claim:

1. A multi-phase transformer, comprising:

a tank for a cooling medium, said tank being divided into separate tank sections;

a superconductive toroidal winding divided into separated winding sections, each one of said winding sections corresponding to one of a number of phases and creating a magnetic flux, at least one of said winding sections being disposed in each one of said tank sections; and at least one yoke disposed between said winding sections, said at least one yoke magnetically coupling said magnetic flux of each of said winding sections to form a magnetically closed circuit.

2. The multi-phase transformer according to claim 1, wherein said at least one yoke is disposed between said tank sections.

3. The multi-phase transformer according to claim 1, wherein said at least one yoke includes a common yoke for at least two of said winding sections.

4. The multi-phase transformer according to claim 1, wherein said at least one yoke includes a common yoke for all of said winding sections.

5. The multi-phase transformer according to claim 1, wherein:

said toroidal winding extends in a longitudinal direction and is divided into said winding sections along said longitudinal direction;

said separated winding sections define original winding sections;

said toroidal winding is divided into an additional separated winding section;

said additional winding section and one of said original winding sections correspond to one of a number of said phases and are magnetically coupled together by at least two yokes.

6. The multi-phase transformer according to claim 5, wherein said extended toroidal winding has an extension and is folded in the vicinity of said extension defining mutually parallel free ends.

7. The multi-phase transformer according to claim 1, wherein said phases are three phases.

8. The multi-phase transformer according to claim 1, wherein said tank is disassembled into said tank sections for transportation.

* * * * *